United States Patent
Dorfman et al.

(10) Patent No.: US 10,481,889 B2
(45) Date of Patent: *Nov. 19, 2019

(54) DEVICE MANAGEMENT SYSTEM WITH A RESTORE PREVENTION UTILITY

(71) Applicant: Oath Inc., New York, NY (US)

(72) Inventors: Scott Dorfman, Reston, VA (US); Steven Andrew Fink, Ashburn, VA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,647

(22) Filed: Feb. 18, 2019

(65) Prior Publication Data

US 2019/0179623 A1   Jun. 13, 2019

Related U.S. Application Data

(63) Continuation of application No. 15/592,063, filed on May 10, 2017, now Pat. No. 10,209,977.

(51) Int. Cl.
  *G06F 9/44* (2018.01)
  *G06F 8/61* (2018.01)
  *G06F 9/46* (2006.01)

(52) U.S. Cl.
  CPC ............... *G06F 8/61* (2013.01); *G06F 9/461* (2013.01)

(58) Field of Classification Search
  CPC ........................................................ G06F 9/44
  See application file for complete search history.

(56) References Cited

U.S. PATENT DOCUMENTS

| | | | | |
|---|---|---|---|---|
| 8,161,551 B1* | 4/2012 | Muttik | ..................... | H04L 63/20 709/220 |
| 2005/0102562 A1* | 5/2005 | Shinohara | ........... | G06F 11/2028 714/15 |
| 2008/0106515 A1* | 5/2008 | Shibata | .................. | B60K 37/06 345/156 |
| 2012/0331464 A1* | 12/2012 | Saito | ..................... | G06F 9/5077 718/1 |
| 2014/0330881 A1* | 11/2014 | Stone | ..................... | H04L 67/10 709/201 |

* cited by examiner

*Primary Examiner* — Jae U Jeon
(74) *Attorney, Agent, or Firm* — Cooper Legal Group, LLC

(57) ABSTRACT

In various embodiments, methods and systems for implementing a device management system with a restore prevention utility are provided. A request is received, at a control server, for an installation file for a restore prevention application. Based on receiving the request, the control server circumvents communication of the installation file based on transmitting a response code. The response code is an informational code that operates as an indicator to wait for a final response. Transmitting the response code triggers maintaining a pending state for the restore prevention application at the controlled device. The pending state includes the restore prevention application partially installed such that when the restore prevention application is partially installed an operating system cleanup utility operation to restore default device configurations for arranging application icons on the controlled device, is circumvented, to maintain an existing device configuration for arranging application icons on the controlled device.

20 Claims, 4 Drawing Sheets

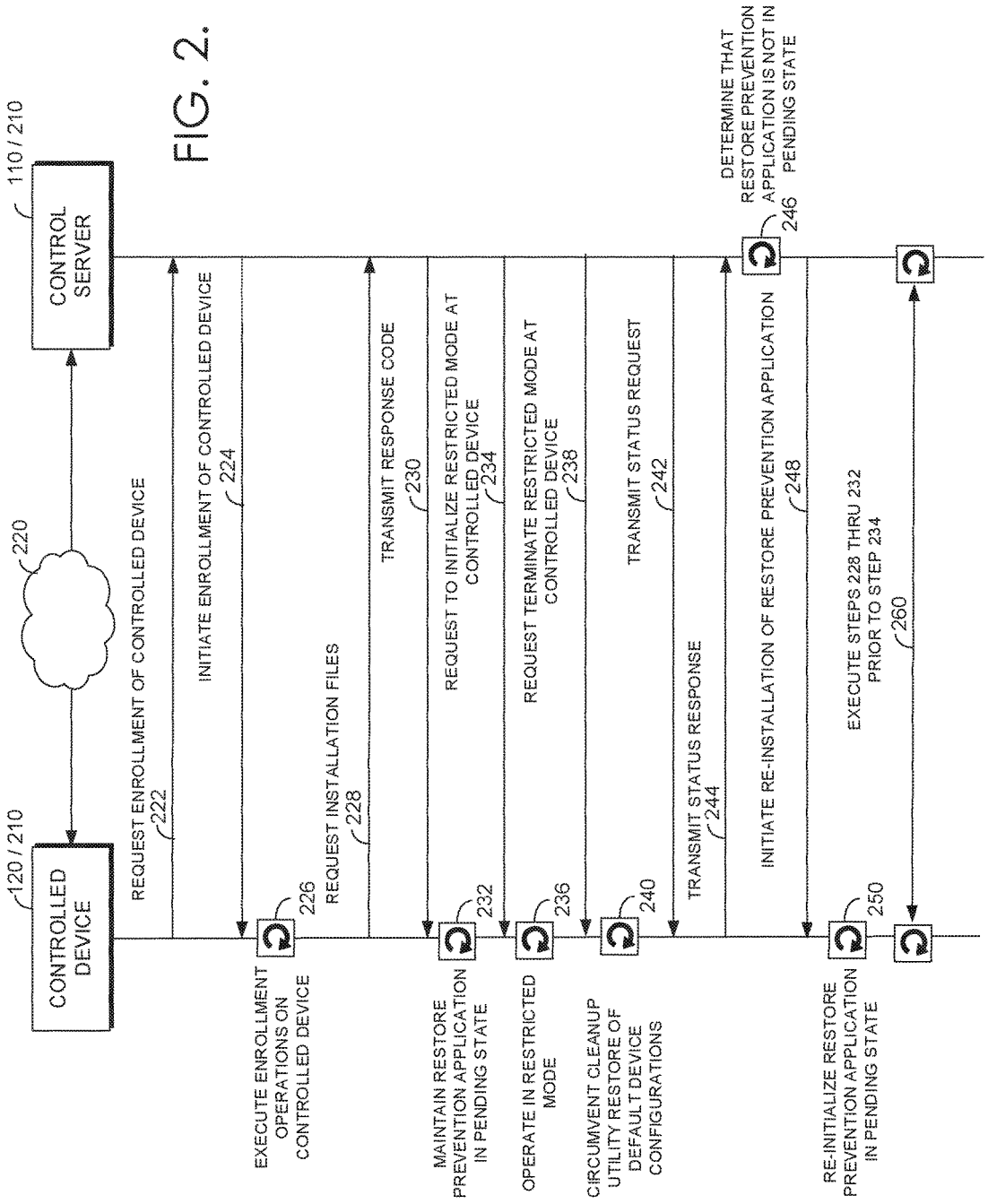

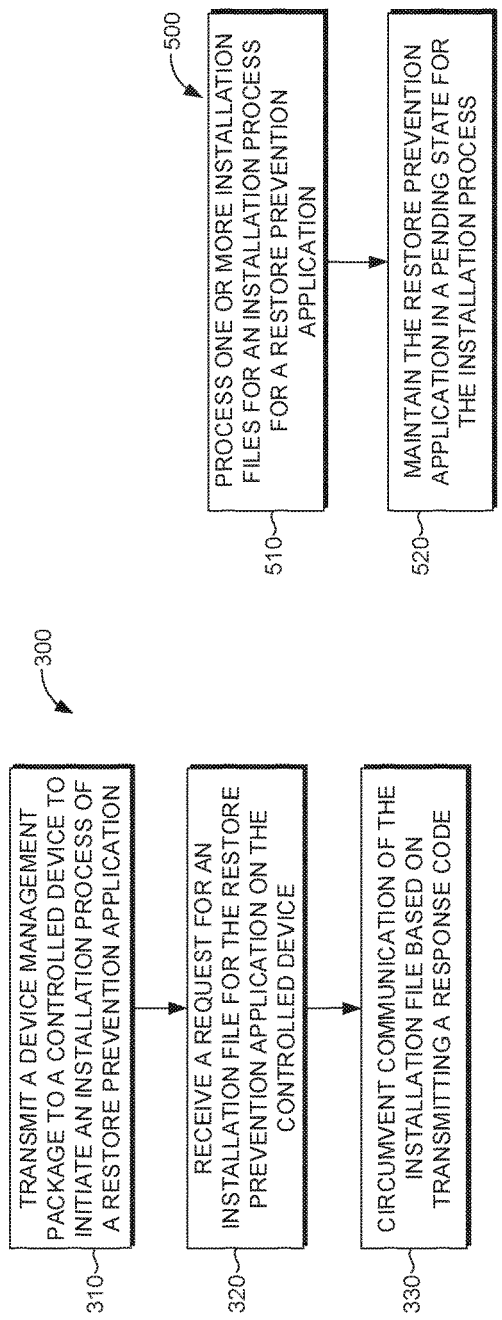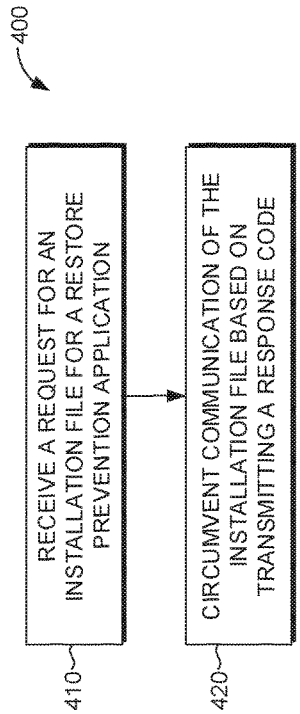

US 10,481,889 B2

DEVICE MANAGEMENT SYSTEM WITH A RESTORE PREVENTION UTILITY

CROSS REFERENCE TO RELATED APPLICATION

This application claims priority to and is a continuation of U.S. application Ser. No. 15/592,063, filed on May 10, 2017, entitled "DEVICE MANAGEMENT SYSTEM WITH A RESTORE PREVENTION UTILITY", which is incorporated herein.

BACKGROUND

An operating system cleanup utility operates to maintain proper states and functioning of installed system files, applications and services running on the operating system. The operating system cleanup utility can be included in a variety of devices including media platforms from video game systems and television systems to mobile devices and personal computers. Implementing and managing third party applications and services for devices that include operating system cleanup utilities can be challenging when the operating system cleanup utility is designed to aggressively maintain specific states for third party applications and services. Third party applications and services may need to operate based on states that are contrary to the operating system cleanup utility objectives. Circumventing such operating system cleanup utility objectives can be achieved using specific configurations, operations and components associated with the operation of the third party applications and services.

SUMMARY

Embodiments of the present invention provide methods and systems for implementing a device management system with a restore prevention utility. A device management system, via a device management manager, supports the administration of one or more mobile devices for third party applications and services. The device management manager communicates a device management package to a mobile device to initiate the installation process of a restore prevention application. The device management package includes configuration files for configuring device management on the mobile device. The device management manager receives a request for an installation file for the restore prevention application. Based on receiving the request for the installation file, the device management manager circumvents communication of the installation file based on transmitting a response code. The response code is an informational code that operates as an indicator for the mobile device to wait for a final response, where the response code is a response code that is not ignored. As such, the response code causes an operating system cleanup utility not to proceed with terminating the installation process of the restore prevention application. The response code can specifically be unidentified or excluded from a list of response codes that cause an operating system cleanup utility to proceed with terminating the installation process of the restore prevention application on the mobile device.

Transmitting the response code triggers maintaining a pending state for the restore prevention application in the installation process at the mobile. The pending state includes the restore prevention application partially installed at the mobile device. When the restore prevention application is only partially installed, an operating system cleanup utility operation to restore default device configurations, for arranging application icons on the mobile device, is circumvented, to maintain an existing device configuration for arranging application icons on the mobile device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 2 is an schematic showing functional components performing an exemplary method for implementing a device management system with a restore prevention utility, in accordance with embodiments described herein;

FIG. 3 is a flow diagram showing an exemplary method for implementing a device management system with a restore prevention utility, in accordance with embodiments described herein;

FIG. 4 is a flow diagram showing an exemplary method for implementing a device management system with a restore prevention utility, in accordance with embodiments described herein;

FIG. 5 is a flow diagram showing an exemplary method for implementing a device management system with a restore prevention utility, in accordance with embodiments described herein.

DETAILED DESCRIPTION

Figure 1:
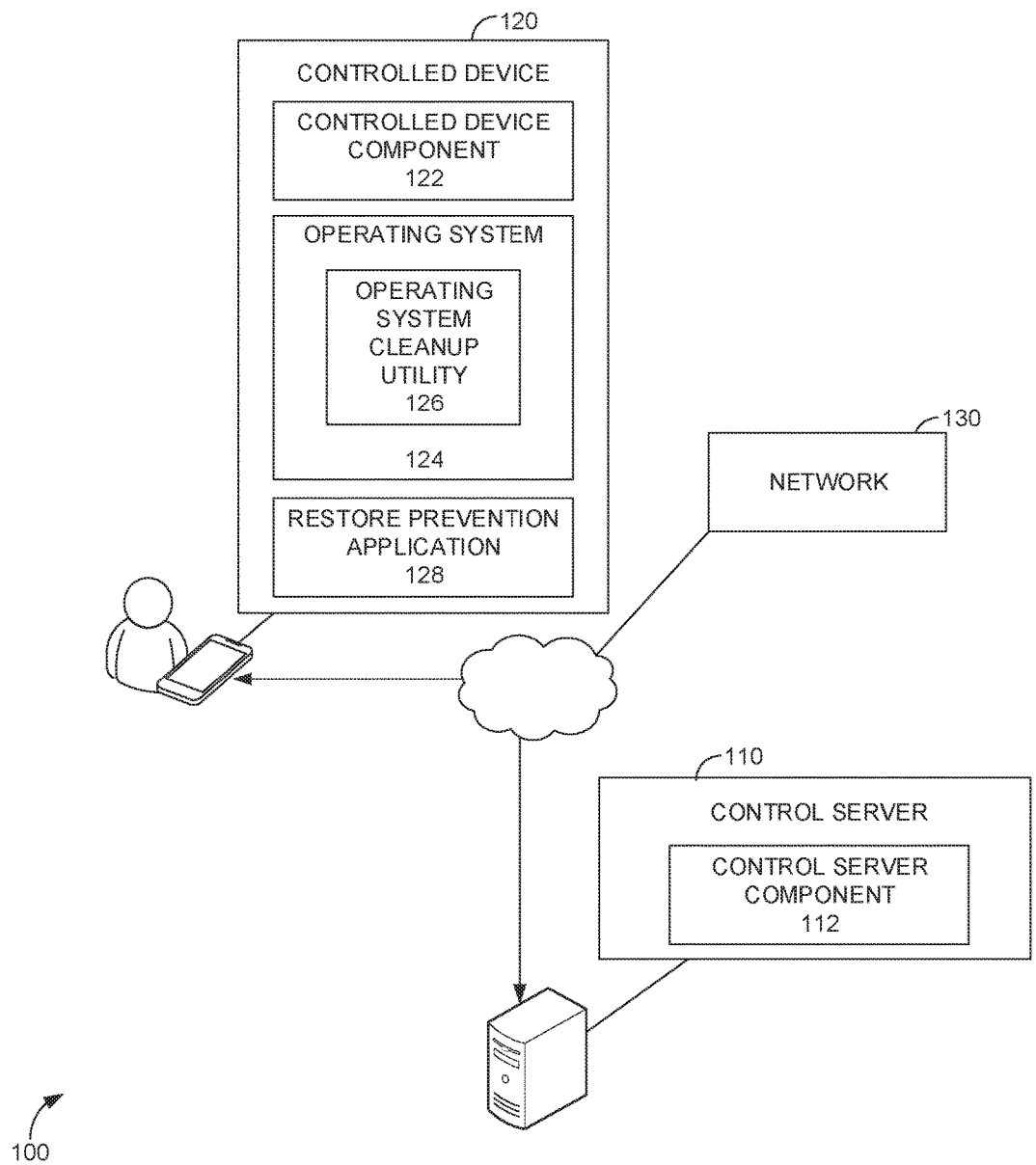
FIG. 1 is a block diagram of an exemplary device management system in which embodiments described herein may be employed.

An operating system cleanup utility operates to maintain proper states and functioning of installed system files, applications and services running on the operating system. The operating system cleanup utility can be included in a variety of devices including media platforms from video game systems and television systems to mobile devices and personal computers. Implementing and managing third party applications and services for devices that include operating system cleanup utilities can be challenging when the operating system cleanup utility is designed to aggressively maintain specific states for third party applications and services.

By way of background, third party products can be maintained based on device management systems having a device management tool (e.g., mobile device management system "MDM"). A device management tool can support administration of devices, such as, media platforms (e.g., video game systems, smart televisions) or mobile devices (e.g., smartphones, tablets, laptop computers). The device management tool can be leveraged to implement features and enforce policies on the devices. For example, a device management tool can be used to implement controls (e.g., content controls, application controls and usage controls) and restrict access to content. In operation, the device management system running the device management tool can include a control server component (e.g., device management manager) that sends out management commands to a controlled device (e.g., a mobile device) having a controlled device component (e.g., device management client application) which runs on the controlled device to receive and implement the management commands.

Third party applications and services operate based on device management commands and operations which trigger predefined operations of an operating system cleanup utility. For example, the device management manager can instruct a mobile device to operate in a restricted mode, such that, the device management manager can implement restrictions and controls (e.g., settings of restriction profile). The restricted mode can be initiated at the mobile device having the device management client application. The restricted mode can be initialized based on transmitting a restriction profile from the device management manager to the mobile device. With the restricted mode initialized, the restriction settings (e.g., disable or hide icons of one or more applications on the mobile device) can be implemented at the mobile device. The restricted mode can be terminated when the device management manager disables or removes the restriction profile.

Terminating the restricted mode is associated with a set of restore operations performed by the operating system cleanup utility, where the set of restore operations include restoring default device configurations. For example, restoring default device configurations can include restoring application icons to default device configurations for the application icons (e.g., restoring application icons in alphabetical order or a predefined configuration). Restoring the default device configuration for the application icons removes an existing device configuration for the applications icons. For example, existing folder hierarchies for folders and subfolders and arrangement of application icons are replaced, upon terminating the restricted mode, with the default device configuration for the application icons. Losing previously existing device configurations, especially folder hierarchies for folders and subfolder and arrangement of application icons can be burdensome to users who then have to reconfigure their user-defined device configurations (e.g., re-arrange application icons). Moreover, the operating system cleanup utility operations can be particularly oppressive when a third party application operates only periodically to initialize and terminate the restricted mode which in turn triggers restoring the default device configuration each time the restricted mode is terminated.

Third party applications and services may need to operate based on particular states to support functionality of the third party applications and services; however such states can be contrary to the operating system cleanup utility objectives. Circumventing such operating system cleanup utility objectives to restore default device configuration, in particular upon terminating a restricted mode, can be achieved using specific configurations, operations and components associated with the operation of the third party applications and services. As such, a comprehensive device management system that supports circumventing cleanup utility operations can help maintain third party applications and services in states preferred by the third party developers.

Embodiments of the present invention provide simple and efficient methods, and systems, for implementing a device management system with a restore prevention utility. At a high level, the device management system implements a restore prevention application on a device having an operating system cleanup utility that operates to restore default device configurations. In particular, using the restore prevention application, the device management system circumvents the operating system cleanup utility's capacity to the restore default device configurations on the device. Circumventing the operating system cleanup utility is based on maintaining the restore prevention application in a pending state of the installation process, in that, while the restore prevention application is in the pending state, the restore prevention application is only partially installed on the device and the operating system cleanup utility does not proceed with restoring default device configurations. Advantageously, the device management system can implement device management functionality on the device while maintaining existing device configurations which would otherwise be overwritten by the operating system cleanup unity.

Embodiments of the device management system with a restore prevention utility can be described based on a specific exemplary implementation. The features of the embodiments described below are meant to be exemplary and not intended to limit the scope of the invention, unless otherwise stated. A mobile device (i.e., a controlled device) that is managed for implementing parental controls and restrict resource requests (i.e., device restrictions and controls) on the mobile device can be part of the device management system. The mobile device is managed using a device management server (i.e., control server) running on device management manager (i.e., control server component) to facilitate mobile device management of the mobile device. In particular, the device management manager controls the mobile device based on a device management payload (i.e., device management package) that refers to a set of files that are transmitted to the mobile device to configure the mobile device for device management. The device management payload can include configuration files for a device management client application (i.e., a controlled device component), the restore prevention application, and a restriction profile. It is contemplated that the configuration files can include instructions on how and where to retrieve one or more installation files for installing the device management client application, the restore prevention application, and the restriction profile. Other variations and combinations of device management payloads and transmitting device management payloads are contemplated with embodiments of the present disclosure.

The device management client application supports implementing controls on the mobile device, the restore prevention application supports circumventing restoration of default configurations of the mobile device, and the restriction profile file includes restriction profile settings for controlling the mobile device. In one exemplary implementation, the device management system along with device management client application, the restore prevention application, and a restriction profile can support a VPN-based parental control service corresponding to the VPN-based parental control service described in U.S. application Ser. No. 15/159,584, entitled "VIRTUAL PRIVATE NETWORK BASED PARENTAL CONTROL SERVICE WITH MOTION-BASED RESTRICTION", incorporated herein by reference in its entirety.

In operation, the mobile device can be enrolled to be managed via the device management system. The device management payload can be communicated to the mobile device, where the device management client application is installed. The restore prevention application can be initialized during part of the installation process but then maintained in a pending state. In one exemplary embodiment, initializing the restore prevention application can include accessing the configuration files in the device management payload. The configuration files instruct the mobile device (e.g., operating system—iOS 10 or greater by developer APPLE Inc.) to sequentially request (e.g., via the device management manager or a host server) corresponding files of an installation package (e.g., a property list file and corresponding archive installer file). The property list file (i.e., .plist file) can be retrieved, where the property file operates to trigger the installation process for the restore prevention application. The property list file can also instruct on a location (e.g., device management manager or a host server) of the corresponding archive installer file (i.e., .ipa file) that can be retrieved during the installation process to complete the installation of the restore prevention application.

The mobile device (e.g., via the operating system or the device management application) can request the archive installer file corresponding to the property list file for the restore prevention application to complete the restore prevention application. While the archive installer file is being retrieved, the restore prevention application is in a pending state of the installation process and if the archive installer file is not received, an operating system cleanup utility that operates to maintain specific states for applications will terminate the installation process and remove the restore prevention application from a pending state (i.e., installing state) to a not-installed state.

Embodiments of the present invention operate to maintain the restore prevention application in the pending state of the installation process, where the pending state includes the restore prevention application only partially installed on the device. As such, the operating system cleanup utility does not proceed with restoring default device configurations. In other words, when the restore prevention application is in the pending state, the operating system cleanup utility operations are circumvented. In particular, the operating system cleanup utility's capacity or logic to restore default device configurations to overwrite existing device configurations is paused or broken when the restore prevention application is the pending state.

As discussed, during the installation process for installing the restore prevention application, a request is transmitted to retrieve the archive installer file for the restore prevention application. When the request is received, for example at the device management manager, communicating the archive installer file is circumvented and instead a response code is communicated such that the restore prevention application installation process is paused and the restore prevention application is maintained in the pending state. In particular, maintaining the restore prevention in the pending state is based on receiving, a response code in response to the request for the archive installer file. The response code is an informational code that operates as an indicator for the mobile device to wait for a final response. The response code is not ignored, such that, it is at least a cause of an operating system cleanup utility not to proceed with terminating the installation process of the restore prevention application. The response code can be excluded from a list of response codes that cause an operating system cleanup utility to proceed with terminating the installation process of the restore prevention application on the mobile device. Typically, unsuccessful response codes are actioned (e.g., during installation) causing the operating system cleanup utility to proceed with terminating the installation process.

The response code can be specifically defined with some variations as described in examples below. For example, the response code can be an informational response code that alerts the operating system to wait for a final response. In this regard, the response code can be a checkpoint or standby code. An informational response indicates that the request was received and understood. The informational response is issued on a provisional basis seemingly to indicate that the request processing continues. In one exemplary embodiment, the response code can be a standard Hypertext Transfer Protocol (e.g., HTTP 103 Checkpoint response). The response code may consist only of the status line and optional header fields, and is terminated by an empty line.

It is further contemplated that the response code may be intentionally or unintentionally excluded from the list of response codes. The response code can be a code that communicates an indication that a host of the archive installer exists, but there exists a delay in transmitting the archive installer file. The response code can also be a code that the operating system (e.g., mobile operating system) has no programmed response for, such that, the response code prevents the operating system cleanup utility from proceeding with terminating the installation process of the restore prevention application. The response code may also be a code which the operating system cleanup utility is not explicitly programmed to ignore and then proceed with terminating the installation process of the restore prevention application. Other variations and combination of response codes that are unidentified or excluded from a list of response codes that cause the operating system cleanup utility to proceed with terminating the installation process of the restore prevention application are contemplated with embodiments described herein.

In operation, the response code can be transmitted to the mobile device and the operating system cleanup utility does not terminate the installation process. In one embodiment, the operating system cleanup utility at least provides an extended period (i.e., not immediately) including several hours, days, weeks or years, for not terminating the installation process and the restore prevention application remains in the pending state or installing state. Advantageously, as the restore prevention application is maintained in the pending state and the installation process is not terminated, the operating system cleanup utility does not proceed with restoring the default device configuration when the restricted mode is terminated. For example, a restricted mode can include disabling applications or hiding the application icons; however, when the restricted mode is terminated, the application icons are not restored to a default device configuration for the application icons (e.g., an alphabetic or predefined arrangement) instead the existing device configuration, (e.g., a user-defined arrangement of application icons) prior to initializing the restricted mode, is maintained on the mobile device.

In one embodiment, the device management system implements a recovery solution having recovery operations for the restore prevention application pending state. Specifically, the recovery solution identifies that the restore prevention application is no longer in the pending state and then proceeds with recovery operations that re-initialize the restore prevention application in the pending state. The recovery solution includes the device management manager at least periodically querying the mobile device for a status of the restore prevention application. A status request is transmitted to the mobile device and the mobile device then communicates a status response. The mobile device can transmit a status response which indicates that the restore application is still in the pending state (e.g., "managed app—installing") which results in no further action on the part of the device management manager.

The mobile device can, in the alternative, transmit a status response which indicates that the restore application is not in a pending state (e.g., "managed app—not installed"). The recovery operations can be implemented in several different ways in order to re-initialize the restore prevention application. For example, the user can be notified to re-install the restore prevention application which includes the mobile device sequentially requesting corresponding files of an installation package (e.g., a .plist file and corresponding .ipa files). The device management manager can automatically push the property file causing the mobile device to request the archive installer file. In either case, the mobile device eventually requests the archive installer file, which results in the device management manager circumventing communicating the archive installer file based on communicating a response code. The mobile device receives the response code and the restore prevention application installation process is paused and the restore prevention application is maintained in a pending state.

As discussed, when the restore prevention application is in the pending state the operating system cleanup utility operations are circumvented. In particular, the operating system cleanup utility's capacity or logic to restore default device configurations to overwrite existing device configurations is paused or broken when the restore prevention application is in the pending state. In this regard, advantageously, a user of the mobile device does not have to reconfigure their user-defined device configurations each time the restricted mode is initiated and terminated.

With reference to FIG. 1, FIG. 1 illustrates an exemplary device management system with a restore prevention utility ("device management system" 100) in which implementations of the present disclosure may be employed. In particular, FIG. 1 shows a high level architecture of device management system 100 having components in accordance with implementations of the present disclosure. It should be understood that this and other arrangements described herein are set forth only as examples. In addition, a system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. For example, although discussed for clarity as the controller server, operations discussed can be performed in a distributed manner via a distributed device management manager service (not shown) running on computing devices in a distributed manner. The system may be formed from other systems and components thereof. It should be understood that this and other arrangements described herein are set forth only as examples.

Among other components not shown, device management system 100 includes a control server 110 having a control server component 112, a controlled device having a controlled device component 122, an operating system 124, an operating system cleanup utility 126, a restore prevention application 128 and a network 130. The components of the device management system 100 may communicate with each other over one or more networks (e.g., public network or virtual private network "VPN"). The network 140 may include, without limitation, one or more local area networks (LANs) and/or wide area networks (WANs). Any number of nodes (e.g., servers) and client computing devices may be employed within the device management system 100 within the scope of implementations of the present disclosure.

The components of the device management system 100 can be implemented in combination to provide the functionality of the device management system described herein. Specifically, the control server 110 is responsible for implementing device management of the controlled device. The device management system 100 can include the control server 110 (e.g., a mobile device management "MDM" tool) that administers mobile devices running a mobile operating system. In particular, the control server 110 can include the control server component 112 (e.g., a device management manager) for performing operations of the control server 110 described herein. The control server 110 can operate as a store for files used for implementing embodiments described herein. For example, the control server 110 can store and transmit the device management package and also host and transmit the installation package for the restore prevention application. Alternatively, the control server 110 can instruct on a location for accessing the device management package and the installation package.

The control server 110 operates to communicate commands, messages, and files that facilitate maintaining a restore prevention application on the controlled device 120 in a pending state of an installation process in order to circumvent an operating system cleanup utility's capacity to restore default device configurations. The control server 110 can receive a request for an archive installer file for the restore prevention application and respond with a response code that is communicated, such that, the restore prevention application installation process is paused and the restore prevention application is maintained in the pending state. In embodiments, the control server 110 also implements a recovery solution that identifies that the restore prevention application is no longer in the pending state and then performs recovery operations that re-initialize the restore prevention application in the pending state.

The controlled device 120 operates based on instructions from the control server 110 and includes several components that support device management functionality on the controlled device 120. The controlled device 120 can be a computing device with components and features described with reference to the computing device in FIG. 6. The controlled device 120 can be a mobile device with a mobile operating system. The controlled device 120 includes a controlled device component 122 (e.g., device management client application) that facilitates implementing device management restrictions and controls. For example, the controlled device can transmit messages to enroll in device management and receive a device management package, as described herein.

The controlled device component 122 operates to receive commands from the control server component 112 via the control server 110 to implement restrictions and controls on the controlled device 120. For example, the control server component 112 can request to initialize and terminate a restricted mode on the controlled device 120 based on communicating one or more messages or commands to the controlled device component 122 to initialize and terminate the restricted mode. The controlled device component 120 can also receive a request for a status of one or more managed applications of the device management system and communicate a corresponding status of the one or more applications. Other variations and combination of device management operations performed using the controlled device component 122 are contemplated with embodiments of described herein.

The controlled device 120 includes an operating system 124 and operating system cleanup utility 126. The operating system 124 supports performing operations on the controlled device including installing applications, requesting installation files, and communicating the status information received via the controlled device component 122. The operating system cleanup utility 126 can be a portion of an operating system of the mobile device or an independent utility configured to maintain system files, applications and services in predefined states. In particular, the operating system cleanup utility 126 can be defined to restore default device configurations (e.g., application icons in alphabetical order) upon termination of a restricted mode at the controlled device 120.

The operating system 124, in combination with the operating system cleanup utility, can perform operations that are exploited to have the restore prevention application operate in a pending state. For example, the operating system having the operating system cleanup utility can be configured to understand response codes that are transmitted during an installation process of an application on the controlled device 120. The operating system can understand the response code as an informational code that operates as an indicator for the operating system to wait for a final response. The response code is not ignored or not processed, such that, the response code causes the operating system and the operating system cleanup utility not to proceed with terminating the installation process of the restore prevention application. The operating system may also maintain a list response codes that cause operating system cleanup utility to proceed with terminating the installation process of the restore prevention application. As such, upon requesting an archive installer file and receiving the informational response code that is successful and not actionable by proceeding with terminating the installation process, the operating system instructs the operating system cleanup utility to not proceed with terminating the installation process and maintains the application in a pending state.

The controlled device 120 can further include a restore prevention application 128. The restore prevention application 128 is maintained in a pending state for restore prevention application in an installation process in order to circumvent the operating system cleanup utility's capacity to restore default device configurations. In particular, the restore prevention application can include at least a portion of an installation package (e.g., a property list file) that initiates the installation process of the restore prevention application, including generating an application icon for the restore prevention application 128. A second portion of the installation package (e.g., an archive installer file) can be requested but the portion of the installation package is not received. A response code is received instead, for example via the operating system 124, where the response code operates to pause the installation process of the restore prevention application, such that, the restore prevention application is maintained in the pending state. In particular, maintaining the restore prevention in the pending state is based on circumventing communicating the archive installer file by communicating the response code, described herein. When the restore prevention application is in the pending state, the operating system cleanup utility operations are circumvented.

It is contemplated that the restore prevention application operates based on a restore prevention application agent (not shown) that supports maintaining the status of the restore prevention application in the pending state. For example, the device management package, the operating system, or the restore prevention application installation package can include a restore prevention application agent that manages the installation process for the restore prevention application. The restore prevention application agent can process configuration files or installation files as part of the installation process for the restore prevention agent. In this regard, the restore prevention application agent can support performing installation operations. In particular, the restore prevention agent can support maintaining a record that the restore prevention application is in a pending state. The restore prevention application, via the restore prevention application agent, can also operate with the operating system for maintaining a record of the current status of the restore prevention application in the pending state. Other variations and combinations of a restore prevention application agent and/or an operating system managing the installation process to maintain a record of the restore prevention application in the pending state are contemplated with embodiments described herein.

Turning to FIG. 2, FIG. 2 illustrates a schematic of exemplary functional components and files, messages and commands communicated between the functional components of the device management system to implement the restore prevention utility. As shown, components described with reference to FIG. 2 are consistent with their corresponding depicted components in FIG. 2. FIG. 2 includes control server 110 and controlled device 120 and corresponding components therein (e.g., control server component, controlled device component, operating system, operating system cleanup utility, restore prevention application—not shown in FIG. 2). It is contemplated that the depicted individual steps can include several additional actions not explicitly depicted in a particular individual step.

Initially at step 222, a message can be communicated from the controlled device (e.g., from the operating system 124) to the control server 110 requesting enrollment of the controlled device 120 for device management via the control server 110. At step 224, based on receiving the enrollment request from the controlled device 120, the control server 110 can initiate enrollment of the controlled device 120. Initiating enrollment of the controlled device can include several operations including communicating a device management package including a set of files that are transmitted to the controlled device 120 to configure the controlled device 120 for device management. The device management package can include configuration files for installing a controlled device component 122 and a restore prevention application 128 on the controlled device 120. It is contemplated the control server 110 may also independently initiate enrollment of the controlled device based previously defined configuration that provides the control server 110 (e.g., control device component 122) access to the controlled device 120.

At step 226, the controlled device 120 executes operations to enroll the controlled device. Enrolling the controlled device 120 can include installing the controlled device component 122 on the controlled device. Enrolling the controlled device 120 can further include installing the restore prevention application on the controlled device 120. Installing the restore prevention application can specifically include sequentially requesting portions of an installation package of the restore prevention application. A property file of the installation package can be retrieved to initiate the installation process including preliminary configurations and generating an application icon. The property file can instruct on retrieving a second portion of the installation package of the restore prevention application. The second portion can be an archive installer file.

At step 228, the controlled device 120 requests the installation file—the archive installer file—from the control server 110. At step 230, the control server 110 (e.g., the control server component 112 or a host of the archive installer file) transmits a response code to the controlled device 120. At step 232, the controlled device 120 (e.g., operating system 124) receives the response code, where the operating system processes the response code The response code can be an informational response code that alerts the operating system to wait for a final response. As such, the installation process is paused and the restore prevention application is maintained in a pending state.

At step 234, the control server 110 can request to initialize the controlled device 120 in a restricted mode. The control server 110 can specifically communicate a restriction profile that is transmitted to, and implemented at, the controlled device. At step 236, the controlled device 120 (e.g., via the controlled device component 112) initializes the restricted mode using the restriction profile and operates in the restricted mode. The restriction profile can specifically include disabling or hiding applications and application icons during the restricted mode. At step 238, the control server 110 can request to terminate the restricted mode on the controlled device 120. The control server 110 can specifically instruct the controlled device 120 to disable or remove the restriction profile. Terminating the restricted mode on the controlled device can trigger an operating system cleanup utility to restore default device configurations.

At step 240, the operating system cleanup utility restoration of the default device configuration is circumvented. In particular, the operating system cleanup utility's capacity or logic to restore default device configurations to overwrite existing device configurations (i.e., existing device configurations prior to initializing the restricted mode) is paused or broken when the restore prevention application is in the pending state. As such, for example, the arrangement of application icons prior to initializing the restricted mode is maintained and not overwritten with a default alphabetical arrangement of application icons.

As previously discussed, the device management system implements a recovery solution having recovery operations for the restore prevention application. Specifically, the recovery solution identifies that the restore prevention application is no longer in the pending state and performs and then proceeds with recovery operations that re-initialize the restore prevention application in the pending state. The recovery solution includes the control server 110 at least periodically querying the mobile device for a status of the restore prevention application.

Accordingly, at step 242, the control server 110 can transmit a status request from the controlled device 120. At step 244, the controlled device 120 can transmit a status response to the control server 110. The controlled device 120 can transmit a status response which indicates that the restore application is still in the pending state (e.g., "managed app—installing") which results in no further action on the part of the control server. The controlled device 120 can, in the alternative, transmit a status response which indicates that the restore application is not in a pending state (e.g., "managed app—not installed").

At step 246, the control server 110 can determine that the restore prevention application is not in a pending state, based on the status response. At step 248, the control server 110 can initiate re-installation of the restore prevention application. At step 250, the controlled device 120 can re-initialize the restore prevention application in a pending state. In particular, at step 260, the controlled device 120 and control server 110 can perform corresponding actions described herein with reference to steps 228 through 232 to re-initialize the restore prevention application in the pending state.

With reference to FIGS. 3, 4 and 5, a plurality of flow diagrams are provided illustrating methods for implementing device management system with a restore prevention utility. The methods can be performed using the device management system described herein. In embodiments, one or more computer storage media having computer-executable instructions embodied thereon that, when executed, by one or more processors, can cause the one or more processors to perform the methods in the device management system. The device management system 100 includes, amongst other components, a control server (e.g., device management server) having a control server component (e.g., device management manager), a controlled device (e.g., a mobile device) having an operating system cleanup utility (e.g., mobile operating system cleanup utility) and a controlled device component (e.g., device management client application) and a network (e.g., VPN network or public network).

Turning to FIG. 3, a flow diagram is provided that illustrates a method 300 for executing implementing a device management system with a restore prevention utility. Initially at step 310, a device management package is transmitted to a controlled device to initiate an installation process of a restore prevention application. The device management package includes configuration files for configuring device management on the controlled device. At step 320, a request for an installation file for the restore prevention application is received. At step 330, based on receiving the request for the installation file, communication of the installation file is circumvented based on transmitting a response code. The response code is an informational code that operates as an indicator for the controlled device to wait for a final response, the response code is not ignored such that the response code causes an operating system cleanup utility to not proceed with terminating the installation process of the restore prevention application. Transmitting the response code triggers maintaining a pending state for the restore prevention application in the installation process at the controlled device. The pending state comprises the restore prevention application partially installed at the controlled device, and when the restore prevention application is partially installed, an operating system cleanup utility operation to restore default device configurations for arranging application icons on the controlled device, is circumvented, to maintain an existing device configuration for arranging application icons on the controlled device.

Turning to FIG. 4, a flow diagram is provided that illustrates a method 400 for implementing a device management system with a restore prevention utility. Initially at step 410, a request for an installation file for a restore prevention application is received. At step 420, communication of the installation file is circumvented based on transmitting a response code. The response code is an informational code that operates as an indicator for the controlled device to wait for a final response.

Turning to FIG. 5, a flow diagram is provided that illustrates a method 500 for implementing a device management system with a restore prevention utility. Initially at step 510, one or more installation files are for an installation process for a restore prevention application. At step 520, a pending state for the installation process of the restore prevention application is maintained. The pending state includes the restore prevention application partially installed, in that, when the restore prevention is only partially installed, an operating system cleanup utility operation to restore default device configurations is circumvented based at least in part on a response code.

With reference to the device management system 100, embodiments described herein use a restore prevention application to circumvent an operating system cleanup utility's capacity to the restore default device configurations on the device. The device management system components refer to integrated components that implement device management. The integrated components refer to the hardware architecture and software framework that support functionality using the device management system components. The hardware architecture refers to physical components and interrelationships thereof and the software framework refers to software providing functionality that can be implemented with hardware operated on a device. The end-to-end software-based device management system can operate within the other components to operate computer hardware to provide device management system functionality. As such, the device management system components can manage resources and provide services for the device management system functionality. Any other variations and combinations thereof are contemplated with embodiments of the present invention.

By way of example, the device management system can include an API library that includes specifications for routines, data structures, object classes, and variables that support the interaction the hardware architecture of the device management system and the software framework of the device management system. These APIs include configuration specifications for the device management system such that the components therein can communicate with each other in device management, as described herein.

Having identified various component of the device management system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The device management system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 6:
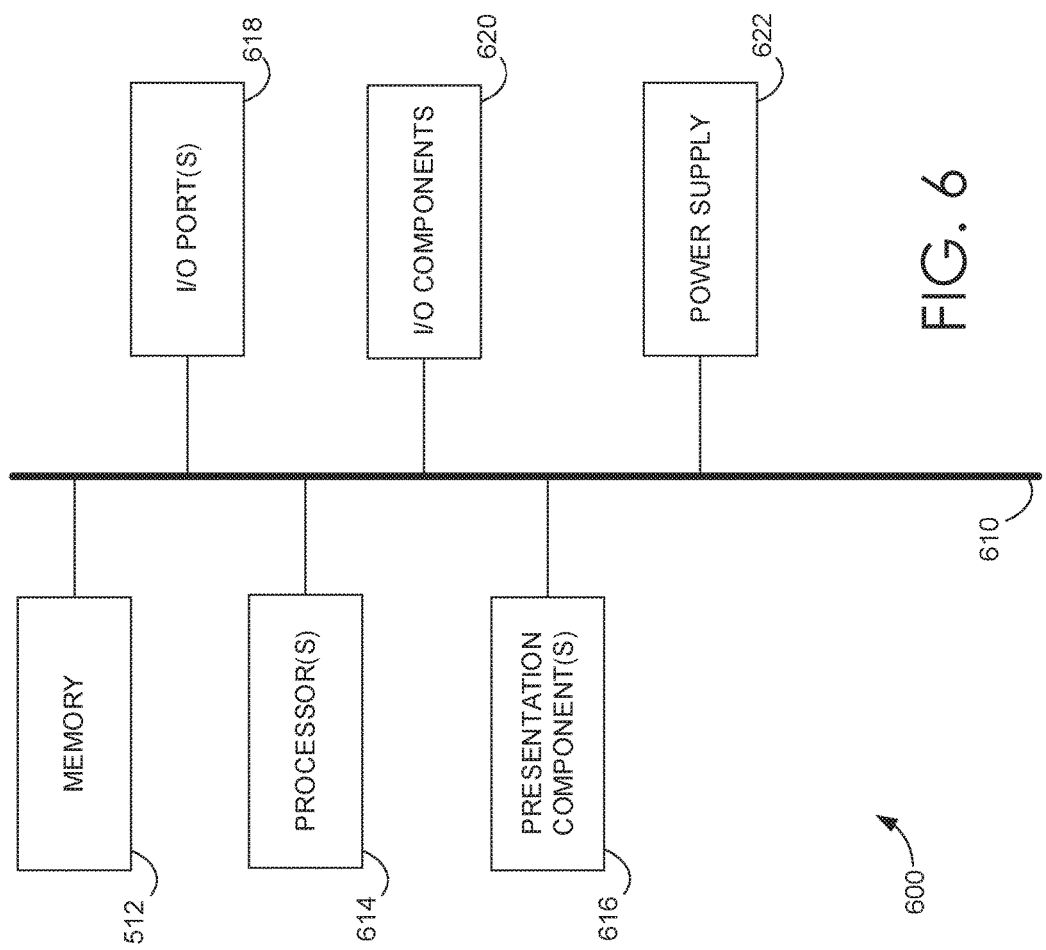
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed data object management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media having computer-executable instructions embodied thereon that, when executed by one or more processors, cause the one or more processors to perform a method, the method comprising:
receiving, from a controlled device, a request for an installation file for a restore prevention application;
based on receiving the request for the installation file, circumventing communication of the installation file based on transmitting a response code, wherein the response code is an informational code that operates as an indicator for the controlled device to wait for a final response,
wherein the response code is associated with maintenance of a pending state for the restore prevention application in an installation process at the controlled device, and
wherein an operating system cleanup utility operation to restore default device configurations for arranging application icons on the controlled device is circumvented, to maintain an existing device configuration for arranging application icons on the controlled device;
communicating a request for the controlled device to operate in a restricted mode; and
communicating a request for the controlled device to terminate operating in the restricted mode, wherein upon terminating the restricted mode, the operating system cleanup utility operation to restore default device configurations, on the controlled device, is circumvented when the restore prevention application is in the pending state, wherein the pending state comprises the restore prevention application partially installed.

2. The media of claim 1, wherein the installation process of the restore prevention application comprises:
causing initialization, at the controlled device, of the restore prevention application in the pending state of the installation process, using a first portion of an installation package of the restore prevention application; and
processing the request for the installation file, wherein the installation file is a second portion of the installation package of the restore prevention application.

3. The media of claim 1, the method further comprising:
communicating a device management package to the controlled device, wherein the device management package comprises configuration files.

4. The media of claim 1, wherein the restricted mode comprises removing one or more application icons, and wherein the operating system cleanup utility operation to restore default device configurations for arranging application icons on the controlled device, is circumvented, to maintain the existing device configuration for arranging application icons on the controlled device.

5. The media of claim 1, the method further comprising:
transmitting a status request for a status of the restore prevention application on the controlled device;
receiving a status response of the status of the restore prevention application on the controlled device;
determining that the restore prevention application is not in the pending state on the controlled device; and
initiating re-installation of the restore prevention application at the controlled device to partially install the restore prevention application.

6. The media of claim 1, wherein the response code is excluded from a list of response codes that cause an operating system cleanup utility to proceed with terminating the installation process of the restore prevention application on the controlled device.

7. A system comprising:
one or more hardware processors; and
one or more computer storage media storing computer-useable instructions that, when used by the one or more hardware processors, cause the one or more hardware processors to execute:
a control server configured to:
receive, from a controlled device, a request for an installation file for a restore prevention application; and
based on receiving the request for the installation file, circumvent communication of the installation file based on transmitting a response code, wherein the response code is an informational code that operates as an indicator for the controlled device to wait for a final response;
a restore prevention application agent configured to:
process one or more installation files for an installation process for the restore prevention application; and
maintain a pending state for the installation process of the restore prevention application, wherein the pending state comprises the restore prevention application partially installed, wherein, when the restore prevention application is partially installed, an operating system cleanup utility operation to restore default device configurations, on the controlled device, is circumvented; and
a component configured to:
request the controlled device to operate in a restricted mode; and
request the controlled device to terminate operating in the restricted mode, wherein upon terminating the restricted mode, the operating system cleanup utility operation to restore default device configurations, on the controlled device, is circumvented when the restore prevention application is in the pending state, wherein the pending state comprises the restore prevention application partially installed.

8. The system of claim 7, wherein the control server further comprises a control server component configured to:
initiate installation of the restore prevention application on the controlled device; and
communicate a device management package to the controlled device to initiate installation of restore prevention application, wherein the device management package comprises configuration files of configuring device management on the controlled device.

9. The system of claim 7, wherein the installation process of the restore prevention application further comprises the control server configured to:
cause initialization of the restore prevention application in the pending state using a first portion of an installation package of the restore prevention application; and
process a request for the installation file, wherein the installation file is a second portion of the installation package of the restore prevention application.

10. The system of claim 7, wherein the control server further comprises a control server component configured to:
communicate a device management package to the controlled device, wherein the device management package comprises configuration files.

11. The system of claim 7, wherein the restricted mode comprises removing one or more application icons, and wherein the operating system cleanup utility operation to restore default device configurations for arranging application icons on the controlled device, is circumvented, to maintain an existing device configuration for arranging application icons on the controlled device.

12. The system of claim 7, wherein the control server further comprises a control server component configured to:
transmit a status request for a status of the restore prevention application on the controlled device;
receive a status response of the status of the restore prevention application on the controlled device;
determine that the restore prevention application is not in the pending state on the controlled device; and
initiate re-installation of the restore prevention application at the controlled device to partially install the restore prevention application.

13. The system of claim 7, wherein the response code is excluded from a list of response codes that cause an operating system cleanup utility to proceed with terminating the installation process of the restore prevention application on the controlled device.

14. A computer-implemented method, comprising:
receiving a request for an installation file for a restore prevention application;
based on receiving the request for the installation file, circumventing communication of the installation file based on transmitting a response code, wherein the response code is an informational code that operates as an indicator for an installation process to wait for a final response,
wherein the response code is associated with maintenance of a pending state for the installation process of the restore prevention application at a controlled device,
wherein the pending state comprises the restore prevention application partially installed, and
wherein, when the restore prevention application is partially installed, an operating system cleanup utility operation to restore default device configurations, on the controlled device, is circumvented;
communicating a request for the controlled device to operate in a restricted mode; and communicating a request for the controlled device to terminate operating in the restricted mode, wherein upon terminating the restricted mode, the operating system cleanup utility operation to restore default device configurations, on the controlled device, is circumvented when the restore prevention application is in the pending state, wherein the pending state comprises the restore prevention application partially installed.

15. The method of claim 14, further comprising:
initiating the installation process of the restore prevention application on a second controlled device; and
communicating a device management package to the second controlled device to initiate the installation process of the restore prevention application,
wherein the device management package comprises configuration files for the installation process of the restore prevention application.

16. The method of claim 14, wherein the installation process of the restore prevention application comprises:
causing initialization, at a second controlled device, of the restore prevention application in the pending state of the installation process using a first portion of an installation package of the restore prevention application; and
processing the request for the installation file, wherein the installation file is a second portion of the installation package of the restore prevention application.

17. The method of claim 14, further comprising:
initiating re-installation of the restore prevention application at the controlled device to partially install the restore prevention application.

18. The method of claim 14, wherein the restricted mode comprises removing one or more application icons, and wherein the operating system cleanup utility operation to restore default device configurations for arranging application icons on the controlled device, is circumvented, to maintain an existing device configuration for arranging application icons on the controlled device.

19. The method of claim 14, further comprising
transmitting a status request for a status of the restore prevention application on a second controlled device;
receiving a status response of the status of the restore prevention application on the second controlled device;
determining that the restore prevention application is not in the pending state on the second controlled device; and
initiating re-installation of the restore prevention application at the second controlled device to partially install the restore prevention application.

20. The method of claim 14, wherein the response code is excluded from a list of response codes that cause an operating system cleanup utility to proceed with terminating the installation process of the restore prevention application on the controlled device.

* * * * *